UNITED STATES PATENT OFFICE.

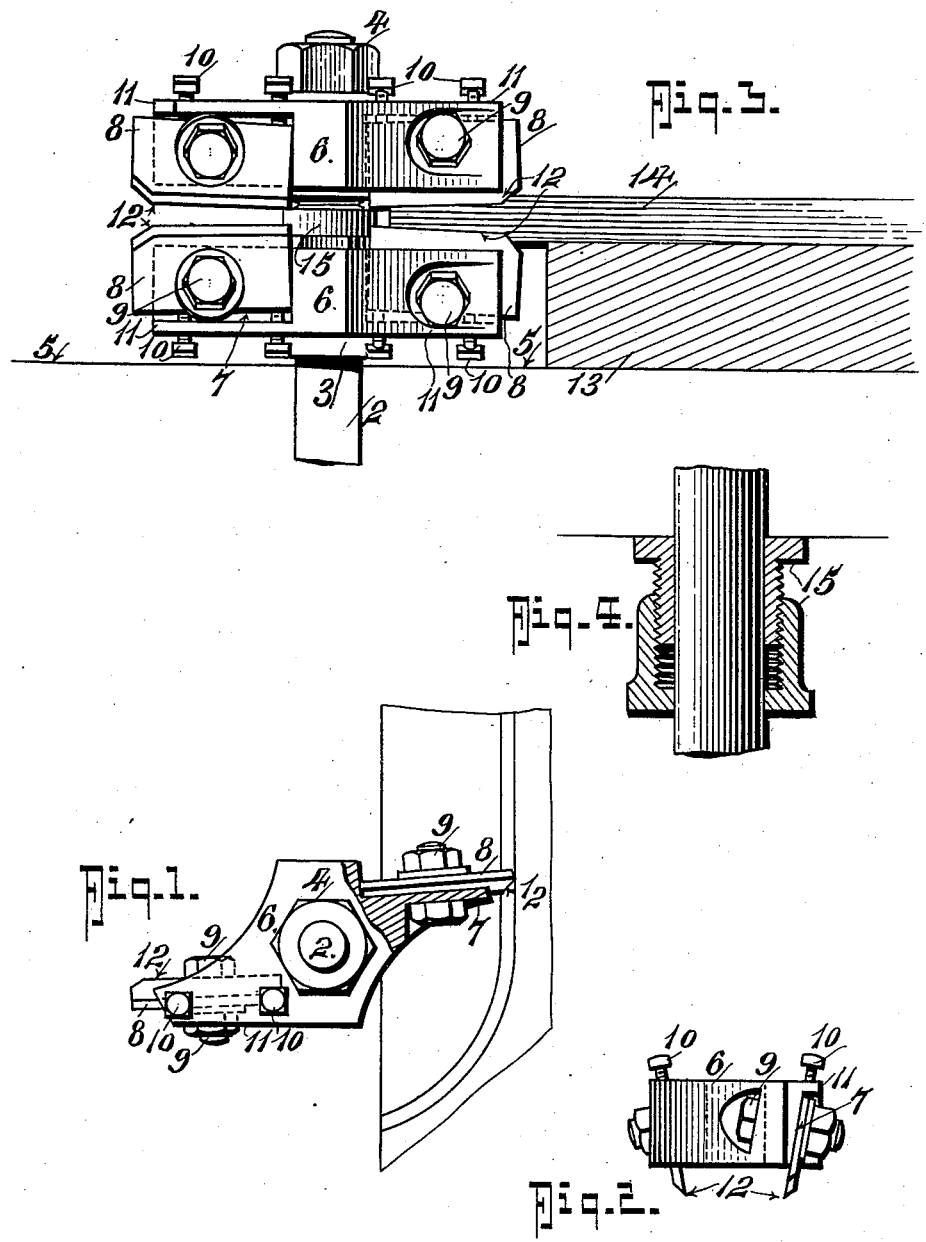

MARK ARBUTHNOT, OF VANCOUVER, BRITISH COLUMBIA, CANADA.

CUTTER-HEAD.

1,015,927.  Specification of Letters Patent.  Patented Jan. 30, 1912.

Application filed March 25, 1911.  Serial No. 616,970.

*To all whom it may concern:*

Be it known that I, MARK ARBUTHNOT, citizen of the Dominion of Canada, residing at Vancouver, in the Province of British Columbia, Canada, have invented a new and useful Cutter-Head, of which the following is a specification.

This invention relates to a cutter head which is particularly designed to reduce the thickness of the edges of a wooden panel for a door or the like in producing what is known in the trade as a raised panel.

The invention is particularly described in the following specification, reference being made to the drawings by which it is accompanied, in which:

Figure 1 is a plan of the cutter head, Fig. 2, an end elevation, Fig. 3, an end view showing the application of the work to the combined cutter heads as secured on the spindle of a shaper, and Fig. 4, a section of the adjustable distance sleeve by which the distance apart of the cutter heads may be varied.

In these drawings 2 represents the arbor of an ordinary wood shaper, 3 being the shoulder on which the cutter head rests and 4 the nut by which it is tightened on that shoulder, 5 being the upper line of the table surface.

The cutter head comprises a body portion 6 bored to fit upon the arbor 2 and having seats at 7 on which the cutting knives 8 are secured by bolts 9 passing through them. The edges 12 of the knives 8 are adjusted by small set screws 10 tapped through a sleeve 11 overhanging each knife seat 7 and enabling the set screws to bear against the back edges of the blade 8. These cutter heads 6 are placed right and left upon the arbor 2 with an adjustable distance collar 15 between them, and on the top of the table 5 is secured a false table 13 on which the panel 14 may be moved to pass its edges between the cutters of the two heads, as shown in Fig. 3.

The adjustable sleeve 15 consists of two portions filled with a fine thread one inside of the other by which the distance between the cutting edges of the two heads may be adjusted. By the use of face cutters on these cutter heads the two heads may be placed on the one spindle and the work may be done upon the under surface and upper surface of the panel 14 simultaneously, and a machine may thus be used that is cheap in first cost and easy to maintain.

The work being performed by face cutters is smoother in its finish and more fitted for the edges of a finished panel than would be the case were the work done by circumferential cutting heads, with which heads any little want of balance readily shows itself.

I am aware that facing cutters have heretofore been provided and I do not broadly claim the same.

Having now particularly described my invention and the manner of its use, I hereby declare that what I claim as new and desire to be protected in by Letters Patent, is:

In a cutter head, an arbor, a shoulder on said arbor, two cutter heads fitted on said arbor, one of said cutter heads resting against said shoulder, a nut against which the other cutter head rests for holding said cutter heads on said arbor, and an adjustable distance piece mounted on said arbor between said cutter heads and including two members threaded together, each of said members having a flat end face to abut the respective cutter heads and hold them in position on the arbor.

In testimony whereof I have signed my name to this specification in the presence of two subscribing witnesses.

MARK ARBUTHNOT.

Witnesses:
T. A. SMIRL,
ROWLAND BRITTAIN.

Copies of this patent may be obtained for five cents each, by addressing the "Commissioner of Patents. Washington, D. C."